(12) United States Patent
Rizzi et al.

(10) Patent No.: US 12,037,741 B2
(45) Date of Patent: *Jul. 16, 2024

(54) TEXTILE ARTICLE COMPRISING GRAPHENE AND PROCESS FOR ITS PREPARATION

(71) Applicant: DIRECTA PLUS S.P.A., Lomazzo (IT)

(72) Inventors: Laura Giorgia Rizzi, Saronno (IT); Giulio Cesareo, Como (IT); Razvan Popescu, Mozzo (IT)

(73) Assignee: Directa Plus S.p.A., Lomazzo (IT)

( * ) Notice: Subject to any disclaimer, the term of this patent is extended or adjusted under 35 U.S.C. 154(b) by 861 days.

This patent is subject to a terminal disclaimer.

(21) Appl. No.: 16/977,173

(22) PCT Filed: Apr. 17, 2019

(86) PCT No.: PCT/EP2019/059987
§ 371 (c)(1),
(2) Date: Sep. 1, 2020

(87) PCT Pub. No.: WO2019/202028
PCT Pub. Date: Oct. 24, 2019

(65) Prior Publication Data
US 2021/0156078 A1    May 27, 2021

(30) Foreign Application Priority Data

Apr. 20, 2018  (IT) .................. 102018000004763

(51) Int. Cl.
*D06M 11/74*  (2006.01)
*B82Y 30/00*  (2011.01)
(Continued)

(52) U.S. Cl.
CPC ........... *D06M 11/74* (2013.01); *C01B 32/182* (2017.08); *D06M 23/16* (2013.01); *B82Y 30/00* (2013.01);
(Continued)

(58) Field of Classification Search
CPC ..... D06M 11/74; D06M 23/16; C01B 32/182; C01B 2204/22; C01B 2204/32;
(Continued)

(56) References Cited

U.S. PATENT DOCUMENTS

2008/0083721 A1*  4/2008  Kaiserman ............. H05B 3/342
219/211
2010/0206863 A1*  8/2010  Ritter ...................... D06M 11/74
219/202
(Continued)

FOREIGN PATENT DOCUMENTS

EP         2570462 A1 *  3/2013  ............. B82Y 30/00
KR     20170055443 A     5/2017
(Continued)

OTHER PUBLICATIONS

Cen, "Design of Flexible Printed Heater to Improve Uniform Heating", IEEE explore, 2019 21st Electronics Packaging Technology Conference (Year: 2019).*
(Continued)

*Primary Examiner* — Jennifer A Steele
(74) *Attorney, Agent, or Firm* — Patterson Intellectual Property Law, P.C.

(57) ABSTRACT

Textile article with a pattern comprising graphene, defining a surface with empty portions and full portions, with a percentage of coverage from 10 to 70% of the surface defined by the pattern, so as to form a thermal circuit for optimal management of the heat absorbed and of the breathability of the article, and the process for its preparation.

17 Claims, 3 Drawing Sheets

(51) Int. Cl.
  *B82Y 40/00* (2011.01)
  *C01B 32/182* (2017.01)
  *D06M 23/16* (2006.01)

(52) U.S. Cl.
  CPC ........... *B82Y 40/00* (2013.01); *C01B 2204/22* (2013.01); *C01B 2204/32* (2013.01)

(58) Field of Classification Search
  CPC .... B82Y 30/00; B82Y 40/00; D10B 2401/18; D10B 2403/02431; Y10T 442/02; Y10T 428/2481
  See application file for complete search history.

(56) References Cited

U.S. PATENT DOCUMENTS

| | | | |
|---|---|---|---|
| 2013/0036802 A1* | 2/2013 | Johnson | A61F 13/42 73/74 |
| 2015/0376014 A1* | 12/2015 | Cesareo | C09D 7/45 252/75 |
| 2016/0374411 A1* | 12/2016 | Brooks | A61F 7/007 165/104.21 |
| 2017/0196513 A1* | 7/2017 | Longinotti-Buitoni | D06P 1/5285 |
| 2022/0074730 A1* | 3/2022 | Aitchison | D01F 9/12 |
| 2022/0411993 A1* | 12/2022 | Rizzi | C09D 7/70 |
| 2023/0225430 A1* | 7/2023 | Cesareo | A41D 13/11 428/219 |
| 2023/0243089 A1* | 8/2023 | Cesareo | B01D 39/08 427/359 |

FOREIGN PATENT DOCUMENTS

| | | | |
|---|---|---|---|
| WO | WO-2004024436 A1 * | 3/2004 | ............ A41D 31/26 |
| WO | 2015193268 A1 | 12/2015 | |
| WO | 2018055005 A1 | 3/2018 | |

OTHER PUBLICATIONS

Seointernational Searching Authority for corresponding PCT/EP2019/059987 dated Apr. 17, 2019, 6 pages.

* cited by examiner

TEXTILE ARTICLE COMPRISING GRAPHENE AND PROCESS FOR ITS PREPARATION

The present invention refers to a textile article on which a pattern comprising graphene is applied, and to the related process for its preparation.

BACKGROUND OF THE INVENTION

Films, polymer membranes and textile articles containing graphene are known, also coupled with other films or textile articles, for producing products with some properties improved by the presence of an appropriate amount of graphene. In fact, graphene can improve, for example, the thermal and electrical conductivity of the article, and hence make its use advantageous in the production of products in various product sectors, for example in the clothing sector and in the sector of electronics applied to fabrics.

Patent literature describes polymer compositions comprising graphene for the production of films and products comprising said film.

CN 105504773 (A) describes a conductive polyurethane film containing from 1 to 10 parts by weight of graphene, obtained with a process that requires premixing of the graphene with a part of the polyurethane and subsequent mixing with the rest of the polyurethane. The film obtained has an electrical conductivity of $10^3$-$10^5 \Omega$.

WO 2017/037642 A1 describes a process for making a polyurethane multi-layer membrane containing graphene. More in particular, the membrane is formed of a layer of polyurethane without graphene (neutral) and a layer of polyurethane containing graphene, hence rendered conductive. In a preferred embodiment, the conductive layer is provided with terminals for electrical connection to a battery adapted to apply a low voltage to the conductive layer and consequently heat the membrane.

Jie Xu et al. Polypyrrole/reduced graphene oxide coated fabric electrodes for supercapacitor application, *Organic Electronics*, September 2015, pp. 153-159, describes a cotton fabric on which reduced graphene oxide and polypyrrole have been deposited, so as to cover the entire surface of the fabric.

US 2011/0143107 A1 describes a process for the production of metallized textile surfaces by means of deposition of two metals according to a pattern with horizontal and vertical lines, with the application of a layer comprising carbon in the form of carbon black, carbon nanotubes or graphene. Articles having this metallized textile surface can be used, for example, to produce heating mantles, luminous textile articles or articles suitable to monitor human organs, or to protect from electromagnetic radiation.

WO 2018/055005 A1 describes flexible electronic components and methods for their production. Flexible electronic components are required to exhibit excellent electrical conductivity. Flexible electronic components comprise a flexible fabric substrate on which a smoothing layer is formed, and a layer of nanoplatelets material deposited on the smoothing layer. The nanoplatelets material can be graphene. Electrodes are then applied to render conductive the components and make them suitable as wearable electronics. FIG. 8 shows parallel and separate stripes of graphene ink deposited on a cotton fabric coated with polyurethane. Reference example 2 describes electrically conducting e-fabrics coated by graphene ink by dip-coating the fabric without smoothing layer. In neither case a pattern comprising graphene and having the shape of a network was formed.

However, the known embodiments do not provide an optimal solution to the problem of comfort of the person wearing an item of clothing and practicing a sport, for example a winter sport. In fact, the item is often either too insulating or too dissipative from a thermal viewpoint, and also causes accumulations of heat in the warmer areas of the body and excessive loss of heat in the colder areas of the body. Moreover, the thermal insulation is often obtained to the detriment of permeability, to both air and water vapor, i.e. of breathability of the item.

Finally, known items of clothing for practicing sports, above all winter sports, have the disadvantage of being heavy.

SUMMARY OF THE INVENTION

An object of the present invention is therefore to provide a textile article that can advantageously be used in the production of items of clothing capable of retaining the heat produced by the human body, for example for multi-layer winter items, or of dissipating it, typically for light single-layer items. Moreover, an object of the textile article according to the invention is also to distribute heat uniformly throughout the body at the same time ensuring breathability of the item, so as to guarantee the comfort of the person wearing it.

Another object of the present invention is to provide a textile article that allows the production of an item of clothing with high performance in terms of management of the heat and comfort of the user, but which is relatively light.

A further object of the present invention is to provide a process for the preparation of a textile article of this kind having the aforesaid characteristics, but which is simple and economically advantageous.

Therefore, an aspect of the present invention relates to a textile article comprising a pattern consisting of a composition comprising graphene, characterized in that:
  a) said pattern defines a surface with empty portions, on which said composition comprising graphene is not present, and full portions, on which said composition comprising graphene is present, said pattern comprising lines that intersect in a plurality of points and form a network structure;
  b) said full portions of said pattern occupy from 10 to 70% of said surface defined by said pattern and said empty portions of said pattern occupy from 90 to 30% of said surface defined by said pattern;
  c) said graphene consists of graphene nanoplatelets, wherein at least 90% has a lateral size (x, y) from 500 to 50000 nm and a thickness (z) from 0.34 to 50 nm, and wherein the C/O ratio is $\geq 100:1$.

In the present description, the term "textile article" designates a substantially flat article such as a fabric, a nonwoven or a polymer film or membrane, as each of these articles can be used in the production of items of clothing. With regard to the fabric, it can be made of natural, artificial or synthetic fiber. With regard to the nonwoven and the polymer film or membrane, they are typically made of artificial fibers or synthetic resins.

With regard to the item of clothing, the term includes, but is not limited to, shirts including T-shirts, jackets, sweatshirt, soft-shell articles, trousers, shorts, hats, bonnets, socks, shoes and shoe linings, gloves and glove linings.

Another aspect of the present invention relates to a process for the preparation of a textile article comprising a pattern consisting of a composition comprising graphene, characterized by comprising the steps of:

(A) Preparing a composition comprising:
  a1) from 10 to 40% by weight of a polymeric binder,
  a2) from 1 to 15% by weight of a compatibilizing solvent for said polymeric binder,
  a3) from 1 to 8% by weight of a thickener,
  a4) from 1 to 20% by weight of graphene consisting of graphene nanoplatelets, wherein at least 90% has a lateral size (x, y) from 50 to 50000 nm and a thickness (z) from 0.34 to 50 nm, and in which the C/O ratio is ≥100:1;
  a5) from 17 to 87% by weight of water;
  having a viscosity of the composition in the range of 4000 to 30000 cPs;
(B) Applying said composition on a flat textile article with the method of screen printing according to a pattern defining a surface with empty portions, on which said composition comprising graphene is not present, and full portions, on which said composition comprising graphene is present, wherein said full portions occupy from 10 to 70% of said surface defined by said pattern and said empty portions occupy from 90 to 30% of said surface defined by said pattern;
(C) Heating said textile article at an increasing temperature of between 120 and 180° C. for a time of between 1 and 10 minutes.

A further aspect of the invention relates to an item of clothing comprising the textile article comprising the pattern consisting of a composition comprising graphene, as defined above.

BRIEF DESCRIPTION OF THE INVENTION

The invention is described below also with reference to the accompanying drawings, wherein.

As mentioned above, the textile article according to the present invention can consist of a fabric, a nonwoven or a polymer film or membrane suitable for making items of clothing. A composition comprising graphene is applied on said textile article so as to form a pattern defining a surface with empty portions 10 and full portions 12, on which the composition comprising graphene is present.

When the textile article or the item of clothing containing it is in contact with the human body or in proximity thereto, the pattern forms a thermal circuit capable of optimally managing the heat absorbed by this circuit. For example, when the textile article forms an item of winter clothing, or a part thereof, in contact with or in proximity to the body of the person wearing it, it is capable of retaining the heat produced by the human body, distributing it uniformly throughout the body and simultaneously ensuring the breathability of the item, so as to maximize the comfort of the person wearing the item. At the same time, when the textile article forms an item of summer clothing, or a part thereof, in contact with or in proximity to the body of the person wearing it, it is capable of dissipating the heat produced by the human body.

The aforesaid properties of the textile article according to the invention are obtained by applying a composition comprising graphene to the article so as to form a pattern wherein:

a) the pattern defines a surface with empty portions, on which the composition comprising graphene has not been applied, and full portions, on which the composition comprising graphene has been applied;
b) the full portions of said pattern occupy from 10 al 70% of said surface defined by said pattern and said empty portions of said pattern occupy from 90 al 30% of said surface defined by said pattern;
c) the graphene consists of graphene nanoplatelets, wherein at least 90% has a lateral size (x, y) from 50 to 50000 nm and a thickness (z) from 0.34 to 50 nm, and wherein the C/O ratio is ≥100:1.

With regard to the characteristic b), it can also be expressed as percentage of coverage of the total surface covered by the pattern, calculated with the following formula:

$$\% \text{ coverage} = \frac{\text{surface of the full portions}}{\text{total surface defined by the pattern}} \cdot 100$$

A practical method for calculating the percentage of coverage consists in isolating a sufficiently large part of the pattern to be statistically representative of the total pattern, for example a part corresponding to an A4 format of printing paper, in a scale of 1:1, or a larger part if necessary, and calculating the surface of the full portions with one of the programs commonly used in the printing sector for calculating the portions involved in printing.

The ISO 216 international paper format standard defines the A4 format as measuring 210 by 297 mm.

Figure 1:
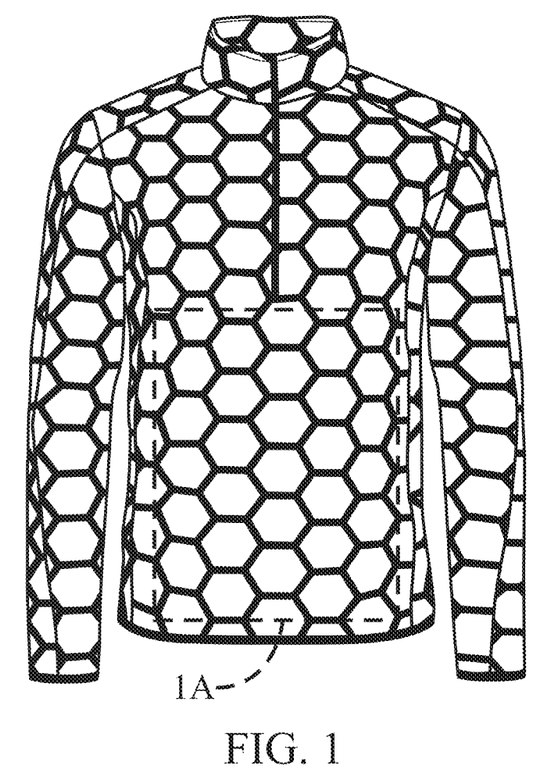
FIG. 1 shows an item of clothing formed with a textile article according to the invention.
Figure 1A:
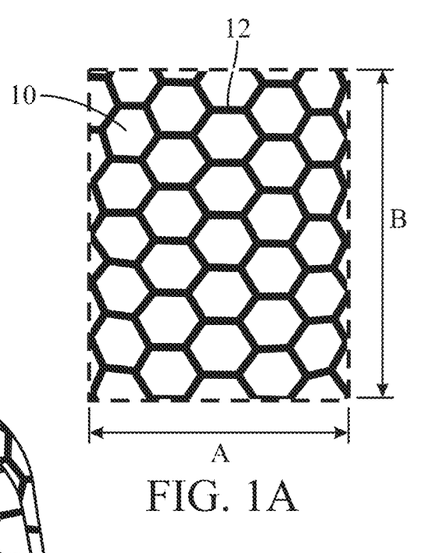
FIG. 1A shows a part of the textile article of FIG. 1.
Figure 2:
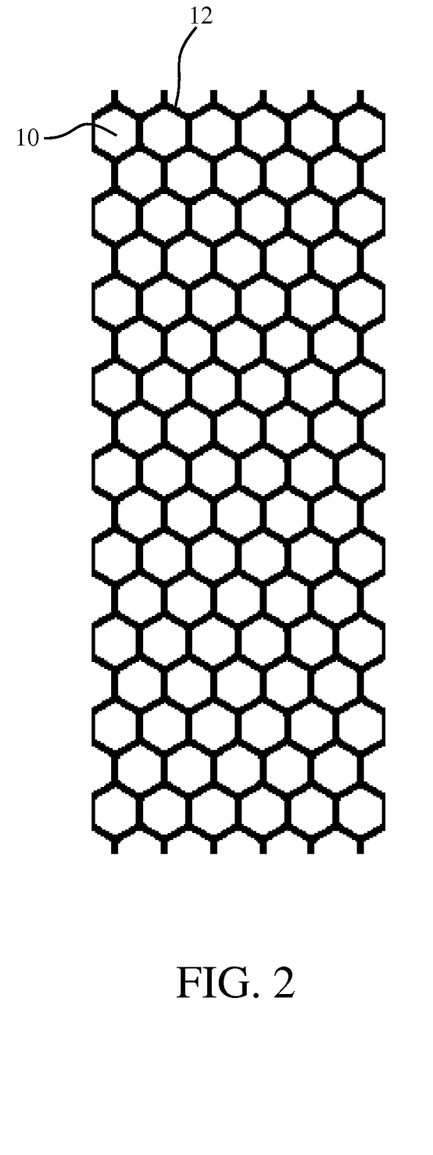
FIGS. 2-4 show part of textile articles comprising patterns according to the invention.

FIGS. 1 and 1A schematically show how to isolate a statistically representative part of the total pattern, for example a part in which the sizes A and B are 210 by 297 mm, hence corresponding to A4 format.

A software program that can advantageously be used to calculate the surface of the full portions is Print.Net, which through the "magic wand" function provides the amount of pixels covered by the print, i.e., the surface area of the full portions, and the total number of pixels of the work page, i.e., of the total surface area defined by the pattern. Another software program that can advantageously be used is Adobe Photoshop, produced by Adobe Systems Incorporated, again using the "magic wand" function.

According to a preferred embodiment, the full portions of the pattern occupy from 13 to 60% of the surface defined by the pattern and the empty portions occupy from 87 to 40% of the surface defined by the pattern, i.e., the percentage of coverage varies from 20 to 60%.

According to an aspect of the present invention, the pattern comprises lines that intersect in a plurality of points. The lines that intersect in a plurality of points are chosen from straight lines, dashed straight lines or curved lines.

According to an aspect of the present invention, the pattern comprises lines that intersect in a plurality of points and form a network structure. The mesh of the network can be regular or irregular.

Non-limiting examples of network patterns that can be applied on textile articles according to the present invention are shown in FIGS. 1-5.

As will be described in more detail below, the application of the pattern on the textile article according to the present invention is preferably implemented with the screen printing technique.

With regard to the material of which the textile article is made, it was said that the fabric can be made of natural, artificial and synthetic fiber, while the nonwoven and the polymer film or membrane are typically made with artificial fibers or synthetic resins.

Useful natural fibers include, for example, wool, silk and cotton. Useful artificial fibers include modified or regenerated cellulose fibers, such as viscose and cellulose acetate. Useful synthetic fibers comprise polyamide, including aromatic polyamides (aramids), polyester, polyurethane, polyacrylonitrile, polycarbonate, polypropylene, polyvinylchloride and blends thereof. Moreover, fabrics obtained by blends of natural, artificial and synthetic fibers can advantageously be used.

The pattern comprising graphene is applied on the textile article in the form of a liquid or paste composition.

Preferably, the graphene is present in an amount from 0.5 to 10% by weight with respect to the total weight of the composition, more preferably between 1 and 6% by weight.

The graphene consists of graphene nanoplatelets, wherein at least 90% has a lateral size (x, y) from 50 to 50000 nm and a thickness (z) from 0.34 to 50 nm and wherein the C/O ratio is ≥100:1. Preferably, at least 90% of the graphene nanoplatelets has a lateral size (x, y) from 100 to 10000 nm, and a thickness (z) from 0.34 to 10 nm.

Graphene is a material formed by a single atomic layer of $sp^2$ hybridized carbon atoms. Therefore, they are arranged in highly crystalline and regular hexagonal close-packed honeycomb structures.

Scientific and patent literature describes various methods for the preparation of graphene, such as chemical vapor deposition, epitaxial growth, chemical exfoliation and chemical reduction of the oxidized form graphene oxide (GO).

The Applicant Directa Plus S.p.A. is the holder of patents and patent applications relating to production methods of structures comprising layers of graphene, such as EP 2 038 209 B1, WO 2014/135455 A1 and WO 2015/193267 A1. The last two patent applications cited describe production methods of pristine graphene dispersions, from which it is possible to obtain graphene nanoplatelets with the size required for implementation of the present invention, and with a C/O ratio ≥100:1. This ratio is important as it defines the maximum amount of oxygen bonded to the carbon forming the graphene. In fact, the best properties of graphene, which derive from its high crystallographic quality, are obtained when the amount of oxygen is minimum.

A pristine graphene, i.e., with a C/O ratio ≥100, and having the size characteristics defined previously, is produced and marketed by Directa Plus S.p.A. with the trade name G+®.

The C/O ratio in the graphene used in the textile article according to the invention is determined by means of elemental analysis performed by elemental analyzer (CHNS O), which provides the percentage by weight of the various elements. By normalizing the values obtained with respect to the atomic weight of the C and O species and finding their ratio, the C/O ratio is obtained.

It was found that the graphene in oxidized form, just as that in the form obtained through reduction of graphene oxide (GO), has different characteristics and properties to pristine graphene. For example, the electrical and thermal conductivity characteristics and the mechanical strength of pristine graphene are superior to those of GO and to the reduction product obtained from it, also due to the presence of numerous reticular defects and imperfections of the crystalline structure caused by the reduction reaction.

The reticular defects of the nanoplatelets can be evaluated using Raman spectroscopy by analyzing the intensity and shape of the Peak D positioned at 1350 $cm^{-1}$.

According to preferred embodiments described in the patent documents mentioned above by the Applicant Directa Plus S.p.A., the process for producing pristine graphene is carried out in a continuous way by continuously feeding graphite flakes to the high temperature expansion step, continuously discharging the so-obtained expanded graphite in an aqueous medium and continuously subjecting the expanded graphite dispersed in the aqueous medium to the exfoliation and size reduction treatment carried out with the methods of ultrasonication and/or high pressure homogenization.

As described in these patent documents, the final dispersion of the graphene nanoplatelets obtained can be concentrated or dried, according to the final form desired for the graphene.

The object of drying the dispersion is to obtain a dry powder that is easily redispersible in various matrices, both solvents and polymers, where liquid is not desirable or manageable at process level, or where water cannot be used due to chemical incompatibility.

A significant advantage of the production processes described in the patent documents WO 2014/135455 A1 and WO 2015/193267 A1 consists in the possibility of operating without using surfactants. In fact, the graphene nanoplatelets thus obtained are pristine, both due to the high C/O ratio and to the absence of extraneous substances that could contaminate them, such as surfactants. In fact, it has been found that in the absence of surfactants it is possible to obtain graphene having substantially higher electrical conductivity than that of graphene obtained with processes that use surfactants. This improves the performance of the graphene in a plurality of applications.

Pristine graphene nanoplatelets, at least 90% of which has a lateral size (x, y) from 50 to 50000 nm and a thickness (z) from 0.34 to 50 nm, having a C/O ratio ≥100:1, have a high electrical conductivity. It was also seen that when a dispersion of graphene nanoplatelets is formed in the presence of a surfactant, this deposits on the surface thereof and tends to promote its agglomeration.

In the present description the size of the graphene nanoplatelets is defined with reference to a system of Cartesian axes x, y, z, it being understood that the particles are substantially flat platelets but may also have an irregular shape. In any case, the lateral size and the thickness provided with reference to the directions x, y and z must be intended as the maximum sizes in each of the aforesaid directions.

The lateral sizes (x, y) of the graphene nanoplatelets are determined, within the scope of the production process described above, by direct measurement on the scanning electron microscope (SEM), after having diluted the final dispersion in a ratio of 1:1000 in deionized water and added it dropwise to a silicon oxide substrate placed on a plate heated to 100° C. Alternatively, if nanoplatelets in dry state are available, SEM analysis is carried out directly on the powder deposited on a double-sided adhesive carbon disc (carbon tape). In both cases measurement is carried out on at least 100 nanoplatelets.

The thickness (z) of the graphene nanoplatelets is determined with the atomic force microscope (AFM), which is essentially a profilometer with subnanometer resolution, widely used for characterization (mainly morphological) of surfaces and of nanomaterials. This type of analysis is commonly used to evaluate the thickness of graphene flakes, produced with any method, and therefore to detect the number of layers forming the flake (single layer=0.34 nm).

The thickness (z) can be measured using a dispersion of nanoplatelets in a ratio of 1:1000 in isopropanol, from which 20 ml is collected and sonicated in an ultrasonic bath (Elmasonic S40) for 5 minutes. The nanoplatelets are then deposited as described for SEM analysis and are scanned directly with an AFM tip, where the measurement provides a topographical image of the graphene flakes and their profile with respect to the substrate, enabling precise measurement of the thickness. The measurement is carried out on at least 50 nanoplatelets.

Alternatively, if nanoplatelets in dry state are available, the powder is dispersed in isopropanol at a concentration of 2 mg/L. 20 ml is collected and sonicated in an ultrasonic bath (Elmasonic S40) for 30 minutes. The nanoplatelets are then deposited as described for SEM analysis and are scanned by AFM.

In the concentrated final dispersion or in the dry form obtained after drying, at least 90% of the graphene nanoplatelets preferably has a lateral size (x, y) from 50 to 50000 nm and a thickness (Z) from 0.34 to 50 nm, and a C/O ratio ≥100:1. Preferably, at least 90% of the graphene nanoplatelets has a lateral size (x, y) from 100 to 10000 nm and a thickness (z) from 0.34 to 10 nm, more preferably a lateral size (x, y) from 200 to 8000 nm, and even more preferably between 500 and 5000 nm, and preferably a thickness (z) from 0.34 to 8 nm, more preferably from 0.34 to 5 nm.

The graphene nanoplatelets having the aforesaid characteristics of size and purity, hence having a very low oxygen content, as defined by the aforesaid C:O ratio and not functionalized with other molecules, proved to be particularly suitable to be applied according to a pattern on a textile article, in order to form a thermal circuit capable of optimally managing the heat absorbed by the circuit. In particular, the following properties are noted:

a) The high thermal conductivity allows uniform heat distribution to be obtained along the circuit. In fact, in the presence of a thermal gradient on the circuit caused by heat transferred by the human body to the circuit through conduction and/or convection and/or radiation, the circuit tends to transfer the heat from the warmer areas to the colder areas, hence producing uniform heat distribution. This mechanism provides the user with a feeling of thermal comfort as it counters the formation of hot spots and reduces the feeling of cold at the extremities of the body.

b) Dissipation of heat: in the presence of a thermal gradient between the circuit comprising graphene and the environment—when the circuit is warmer than the environment and a flow of air is present—the circuit acts as a heat sink, transferring the excess heat and providing the user with a feeling of coolness.

c) Thermal insulation: exploiting the high coefficient of absorption of the infrared radiation the circuit can be used to increase the insulating power of an item of clothing, by optimally 'trapping' the infrared radiation emitted by the body.

d) Electrical conductivity, useful for dissipation of electrostatic energy.

The thermal circuit formed by the pattern is characterized by the following parameters:

i. Thermal conductivity in the order of several W/mK. It must be borne in mind that the thermal conductivity of a metal is generally >20 W/mK, and that of insulating polymers is generally <0.1 W/mK.

ii. Absorption of infrared radiation of around 90% of the incident radiation with wavelength between 380 and 2500 μm.

The pattern defining the network structure described above forms a thermal circuit that exhibits also a limited electrical conductivity, expressed as surface resistivity, of $10^4$-$10^8$ Ω/γ, preferably of $10^5$-$10^7$ Ω/γ, measured according to the standard JIS K 7194. A suitable instrument for this measurement is the Low Resistivity Meter LORESTA GX. More details on this measurement are provided in the examples.

The limited electrical conductivity of textile articles according to the invention is suitable to show an antistatic effect. The articles are not required to possess a high electrical conductivity since they are not conceived as wearable electronic items.

The electrical conductivity depends primarily on the amount of graphene deposited on the textile article, but it depends also on the presence of a polymeric binder in the composition comprising graphene used to apply the pattern on the textile article, as it will be described in the following. Polymeric binders are typically electrical insulators.

According to an aspect of the present invention, the textile article comprises an amount of graphene distributed along the pattern from 0.2 to 5 g per square met \er of textile article, preferably from 0.4 to 4 g/m².

The pattern that forms the thermal circuit must be designed according to criteria useful to combine the performance of the graphene with the technically relevant properties of the textile article, such as air flow, breathability and weight. In fact, at the circuit, i.e., the full portions of the pattern, a reduction of air flow, a reduction of breathability and an increase of weight occur, also due to the presence of the other components of the composition used to apply the pattern, which are prevalent by weight with respect to the amount of graphene.

The main criteria to be taken into consideration are:

a) The percentage of coverage, calculated as defined above, of between 10 and 70%, more preferably between 20 and 60%. Percentages of coverage in the low area of the range are adapted to promote thermal dissipation, as they promote air flow and breathability, while percentages of coverage in the high area of the range are adapted to promote thermal insulation, as they promote greater absorption of the body's infrared rays. In any case, the objectives of heat distribution and dissipation and of heat insulation described above are ensured.

b) The full portions of the pattern preferably have the form of continuous lines characterized by a width greater than 2 mm and less than 2 cm.

c) The pattern forms a circuit interconnected in the plane X-Y, above all to promote uniform heat distribution.

The composition comprising graphene used to apply a pattern on the textile article of the invention is preferably in liquid or paste form, where the liquid is preferably water or a mixture of water with other solvents and/or dispersants.

In an embodiment the composition comprises:

a) from 10 to 40% by weight of a polymeric binder, a2) from 1 to 15% by weight of a compatibilizing solvent for said polymeric binder, a2) from 1 to 8% by weight of a thickener, a3) from 1 to 20% by weight of graphene consisting of graphene nanoplatelets, wherein at least 90% has a lateral size (x, y) from 50 to 50000 nm and a thickness (z) from 0.34 to 50 nm, and wherein the C/O ratio is ≥100:1;

a4) from 17 to 86% by weight of water;

The viscosity of the composition is in the range between 4000 to 30000 cPs and is mainly adjusted by adjusting the amount of thickener in the range 1-8% by weight.

The viscosity is measured with a Fungilab series Viscolead PRO rotational viscometer, R6 spindle, speed 10 rpm, measurement at T=20° C.

The viscosity of the composition is preferably in the range between 10000 and 20000 cPs.

The composition preferably also contains a dispersant and an anti-foaming agent. The sum of these two components in the composition varies from 0.1 to 2% by weight.

In a preferred embodiment the composition comprises:

a1) from 10 to 30% by weight of a polymeric binder, a2) from 3 to 10% by weight of a compatibilizing solvent for said polymeric binder, a3) from 2 to 5% by weight of a thickener, a4) from 2 to 15% by weight of graphene consisting of graphene nanoplatelets, wherein at least 90% has a lateral size (x, y) from 100 to 10000 nm and a thickness (z) from 0.34 to 10 nm, and wherein the C/O ratio is ≥100:1;

a5) from 40 to 83% by weight of water.

Preferably, the polymeric binder a1) is chosen from the group consisting of polyurethanes, polyacrylates, polybutadienes, copolymers of acrylic acid. Among the polyurethanes, anionic polyurethanes are preferred, obtainable for example through reaction of one of more diisocyanates, preferably aliphatic or cycloaliphatic diisocyanates, with one or more polyester diols, and preferably one or more hydroxy carboxylic acids, for example hydroxy acetic acid, or preferably dihydroxy carboxylic acids. A preferred binder is a polyester based aliphatic polyurethane formulated with isocyanate crosslinker.

Preferably, the compatibilizing solvent a2) for the polymeric binder is ethylene or propylene glycol.

The thickener a3) can be a natural or synthetic thickener. Examples of inorganic natural thickeners are laminar silicates such as bentonite. Examples of organic natural thickeners are proteins such as casein or polysaccharides. Natural thickeners chosen from agar agar, gum arabic and alginates are particularly preferred.

Examples of synthetic thickeners are generally liquid solutions of synthetic polymers, in particular polyacrylates.

Preferably, the graphene a4) consists of graphene nanoplatelets, at least 90% of which has a lateral size (x, y) from 50 to 50000 nm, a thickness (z) from 0.34 to 50 and a C/O ratio ≥100:1. Preferably, at least 90% of the graphene nanoplatelets has a lateral size (x, y) from 100 to 10000 nm and a thickness (z) from 0.34 to 10 nm, more preferably a lateral size (x, y) from 200 to 8000 nm, even more preferably between 500 and 5000 nm, and even more preferably a thickness (z) from 0.34 to 8 nm, more preferably from 0.34 to 5 nm.

Preferably the dispersant is chosen from naphthalene sulfonate, polyethylene glycol (PEG) and polyvinylpyrrolidone (PVP).

Preferably, the antifoaming agent is chosen from silicon defoamers, alkoxylated fatty alcohols and alkyl esters of fatty acids of $C_8$-$C_{20}$.

The process for the preparation of the textile article according to the invention comprises the steps of:

(A) Preparing a composition comprising the components a1)-a5) as said above, and adjusting the viscosity of the composition in the range between 4000 and 30000 cPs;

(B) Applying said composition on a flat textile article with the method of screen printing according to a pattern defining a surface with empty portions, on which said composition comprising graphene is not present, and full portions, on which said composition comprising graphene is present, wherein said full portions occupy from 10 to 60% of said surface defined by said pattern and said empty portions occupy from 90 to 40% of said surface defined by said pattern;

(C) Heating said textile article to an increasing temperature of between 120 and 180° C. for a time of between 1 and 10 minutes.

Preparation of the step (A) is preferably carried out by placing the polymeric binder a1) pre-dispersed in water in a receptacle stirred with a rotating blade stirrer, into which the graphene, the compatibilizing agent of the binder and the dispersant are then added. The composition is stirred until a uniform dispersion is obtained. Typically, stirring is conducted at a rotation speed of the stirrer between 1000 and 2500 rpm for a time from 1 to 2 hours.

Figure 5:
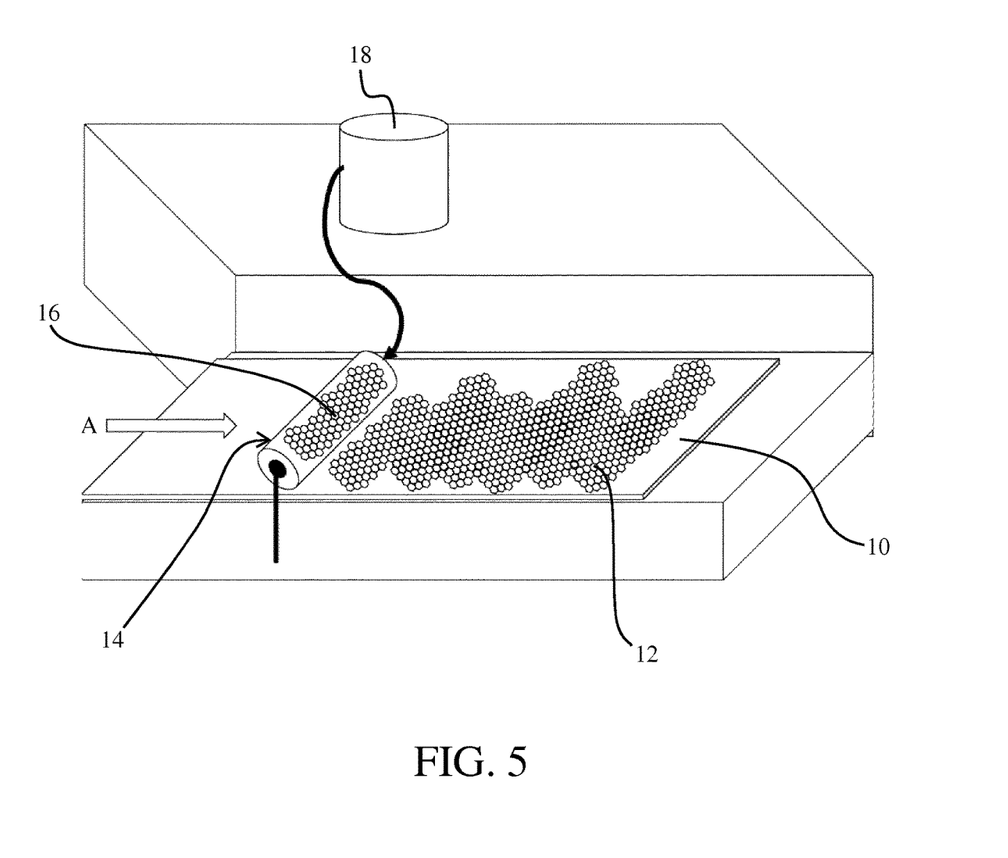
FIG. 5 schematically illustrates a screen printing process of a textile article comprising a pattern according to the invention.

Step (B) of applying the composition on the textile article is preferably carried out with the method of screen printing, known to those skilled in the art, which is illustrated briefly with reference to FIG. 5.

In FIG. 5, the numeral 10 indicates a textile article, for example a cotton cloth, which advances in the direction of the arrow A, on which the composition prepared in step (A) is applied. The method of screen printing carries out deposition of the composition according to a pattern 12, for example a grid of hexagonal cells. The method and technique of screen printing are known to those skilled in the art and therefore no detailed description is provided.

Application of the pattern takes place through a photoengraved roller 14, in which the engravings 16 have the form of the pattern to be applied. The roller is supplied with the composition comprising the graphene coming from the reservoir 18. The composition passes through the engravings 16 and is deposited on the fabric 10, reproducing the pattern engraved on the roller on the fabric.

According to an aspect of the present invention, the pattern comprises lines that intersect in a plurality of points. The lines that intersect in a plurality of points are chosen from straight lines, dashed straight lines or curved lines.

According to an aspect of the present invention, the pattern comprises lines that intersect in a plurality of points and form a network structure. The mesh of the network can be regular or irregular.

In step (C) the fabric is introduced into an oven and heated to a temperature of between 120 and 180° C. for a time of between 1 and 10 minutes. The heat treatment causes evaporation of the liquid, completion of polymerization of the polymeric binder and/or cross-linking of the its components, and hardening of the composition.

The textile article obtained can therefore be used advantageously to produce articles in the clothing sector, particularly clothing for sporting and leisure use.

The examples below illustrate some embodiments of the invention and are provided by way of non-limiting example.

Example 1

Step (A)
Preparation of a Composition Containing Graphene

In a receptacle provided with a mechanical stirrer (Dissolver DISPERMAT® CN100, Heavy Duty disc diameter 350 mm) the rotation speed is set to 200 rpm and the following are added:
- 100 kg of polymeric binder consisting of water-based pre-catalyzed polyurethane resin containing around 30% of dry polymer (Resin E9010 marketed by CPL Chimica, Italy):
- 2 kg of graphene powder (G+ marketed by Directa Plus SpA), consisting of nanoplatelets having a lateral size between 500 and 6000 nm, a thickness between 0.34 and 3 nm, and a C/O ratio=135
- 3 kg of compatibilizing solvent consisting of ethylene glycol (Sigma Aldrich)
- 0.2 kg of dispersant consisting of naphthalene sulfate (BASF)
- 0.4 kg of thickener (SINTEX CA, CPL Chimica, Italy).

A paste having a viscosity of 14314 cPs is obtained and stiffing is increased to 1000 rpm and maintained for 1.5 hours. The viscosity is measured with a Fungilab rotational viscometer, series Viscolead PRO, R6 spindle, speed 10 rpm, measurement at T=20° C.

The concentration of graphene in the paste is 1.9% by weight.

Step (B)
Application of the Composition Prepared in Step (A).

With reference to FIG. 5, the composition of Step (A), having the consistency of a paste, is transferred into a reservoir 18 and from there it is pumped into a roller 14 of a REGGIANI MACCHINE rotary printer, model Revolution 320/18/13, only one roller of which is used, on which a print speed of 10 m/min is set. The roller is photoengraved with a grid pattern with hexagonal mesh, as in FIG. 2, having a percentage of coverage of 27%, calculated with the method described above. The fabric 10 that is printed is a blend of the following synthetic fibers: polyamide 72% and polyurethane 28%, having a grammage of 164 g/m$^2$.

At the end of Step (B) the amount of composition applied on the fabric was of 35 g/m$^2$. The amount of graphene deposited on the fabric was of 0.67 g/m$^2$.

Step (C)
Heating

The fabric is fed through an oven (not illustrated) and heated to 150° C. for 3 minutes to promote cross-linking of the polymeric binder.

At the end of Step (C) the fabric is analyzed to measure the following characteristics:
- Surface resistivity (LORESTA GX): 8.4·10$^7$Ω (standard JIS K 7194). The surface resistivity is calculated by dividing the volumetric resistivity by the thickness of the conductive film, where conductive film means the full portions of the pattern. The volumetric resistivity is measured with the standard JIS K 7194, as indicated above.
- In-plane thermal conductivity (HOT-DISK): 1.1 W/mK (ISO 22007-2)
- Infrared absorption: 90%, measured with the following method:
- A spectrophotometer with integrating sphere having a geometry of 8°/t is used. The sample is placed at 8° with respect to the IR radiation source and the total radiation reflected or transmitted by the sample is measured. The measurements are conducted in the range of wavelengths from 380-2500 nm. The transmittance (T) and reflectance (R) values are obtained directly from the instrumental measurement, while the absorbance values (A) are mathematically derived from the former: R %+T %+A %=100, where R %=percentage of reflectance, T %=percentage of transmittance, A %=percentage of absorbance.

Example 2

Step (A)
Preparation of a Composition Containing Graphene

In a receptacle provided with a mechanical stirrer (Dissolver DISPERMAT® CN100, Heavy Duty disc diameter 350 mm) the rotation speed is set to 200 rpm and the following are added:
- 100 kg of polymeric binder consisting of water-based pre-catalyzed polyurethane resin containing around 30% of dry polymer (Resin E9010 marketed by CPL Chimica, Italy);
- 3 kg of graphene powder (G+ marketed by Directa Plus SpA), consisting of nanoplatelets having a lateral size of between 2000 and 8000 nm, a thickness of between 0.34 and 6 nm, and a C/O ratio=115;
- 4 kg of compatibilizing solvent consisting of ethylene glycol (Sigma Aldrich);
- 0.3 kg of dispersant consisting of naphthalene sulfate (BASF);

A paste having a viscosity of 14831 cPs is obtained and stiffing is increased to 1000 rpm and maintained for 3 hours.

The concentration of graphene in the paste is 2.8% by weight.

Step (B)
Application of the Composition Prepared in Step (A).

Figure 3:
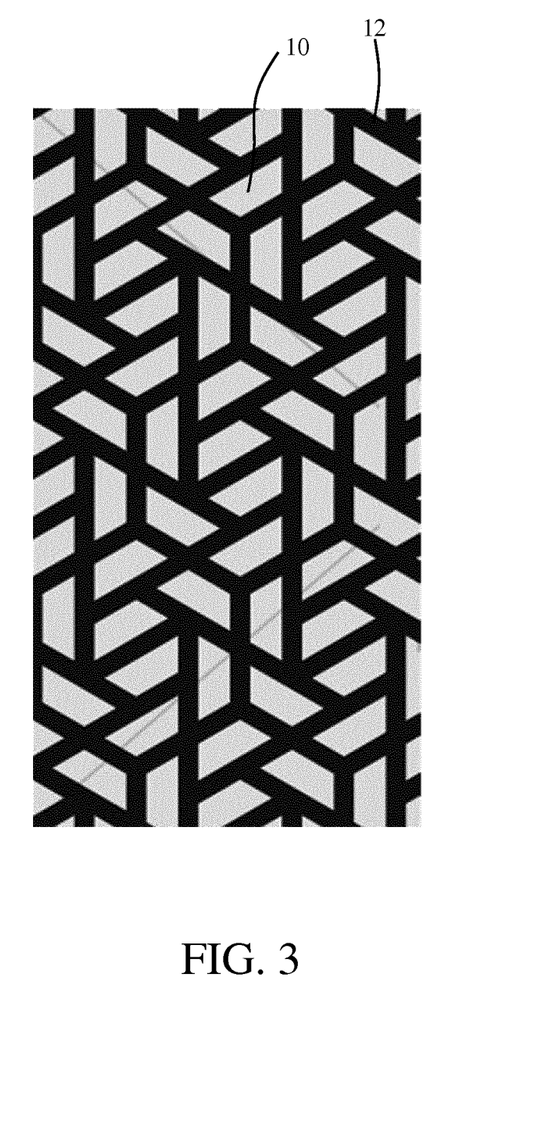

With reference to FIG. 5, the composition of the Step (A), having the consistency of a paste, is transferred to a reservoir 18 and from here is pumped into a roller 14 of a REGGIANI MACCHINE rotary printer, model Revolution 320/18/13, only one roller of which is used, on which a print speed of 10 m/min is set. Unlike FIG. 5, the roller is photoengraved with a grid pattern with a triangular base, as shown in FIG. 3, having a percentage of coverage of 54%, calculated with the method described above. The fabric 10 that is printed is a blend of the following synthetic and artificial fibers: aramid 50% and viscose 50%, having a grammage of 110 g/m$^2$.

At the end of Step (B) the amount of composition applied on the fabric was of 33 g/m$^2$. The amount of graphene deposited on the fabric was of 0.92 g/m$^2$.

Step (C)
Heating

The fabric is fed through an oven (not illustrated) and heated to 150° C. for 3 minutes to promote cross-linking of the polymeric binder.

At the end of Step (C) the fabric is analyzed to measure the following characteristics:
- Surface resistivity (LORESTA GX): 2.1·10$^6$Ω, measured with the method of Ex. 1
- In-plane thermal conductivity (HOT-DISK): 1.8 W/mK (ISO 22007-2)
- Infrared absorption: 90%, measured with the method of Ex. 1.

Example 3

Step (A)
Preparation of a Composition Containing Graphene

In a receptacle provided with a mechanical stirrer (Dissolver DISPERMAT® CN100, Heavy Duty disc diameter 350 mm) the rotation speed is set to 200 rpm and the following are added:

- 100 kg of polymeric binder consisting of water-based pre-catalyzed polyurethane resin containing around 30% of dry polymer (Resin E9010 marketed by CPL Chimica, Italy);
- 4 kg of graphene powder (G+ marketed by Directa Plus SpA), consisting of nanoplatelets having a lateral size of between 1000 and 10000 nm, a thickness of between 0.34 and 10 nm, and a C/O ratio=145;
- 5 kg of compatibilizing solvent consisting of ethylene glycol (Sigma Aldrich);
- 0.4 kg of dispersant consisting of naphthalene sulfate (BASF);

A paste having a viscosity of 17234 cPs is obtained and stirring is increased to 1000 rpm and maintained for 5 hours.

The concentration of graphene in the paste is of 3.6% by weight.

Step (B)
Application of the Composition Prepared in Step (A).

Figure 4:
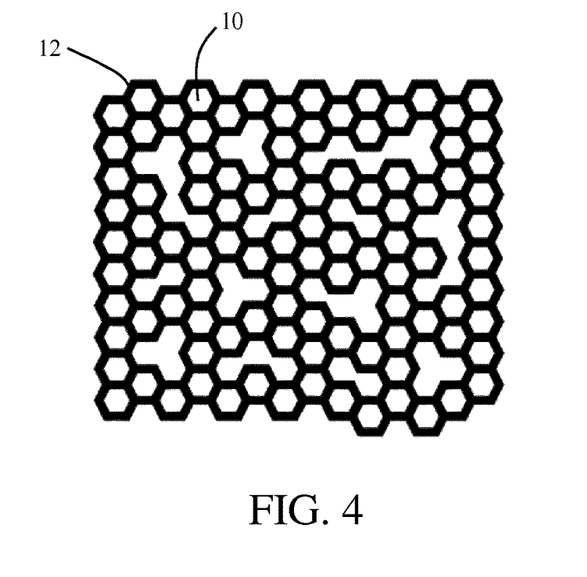

With reference to FIG. 5, the composition of Step (A), having the consistency of a paste, is transferred to a reservoir 18 and from here is pumped into a roller 14 of a REGGIANI MACCHINE rotary printer, model Revolution 320/18/13, only one roller of which is used, on which a print speed of 10 m/min is set. Unlike FIG. 5, the roller is photoengraved with a grid pattern with hexagonal mesh with breaks, as shown in FIG. 4, having a percentage of coverage of 44%, calculated with the method described above. The fabric 10 that is printed is a denim fabric consisting of 100% cotton, having a grammage of 230 g/m$^2$.

At the end of Step (B) the amount of composition applied on the fabric was of 40 g/m$^2$. The amount of graphene deposited on the fabric was of 1.44 g/m$^2$.

Step (C)
Heating

The fabric is fed through an oven (not illustrated) and heated to 150° C. for 3 minutes to promote cross-linking of the polymeric binder.

At the end of Step (C) the fabric is analyzed to measure the following characteristics:

- Surface resistivity (LORESTA GX): 4.3·10$^5$52, measured with the method of Ex. 1.
- In-plane thermal conductivity (HOT-DISK): 2.4 W/mK (ISO 22007-2)
- Infrared absorption: 90%, measured with the method of Ex. 1.

The invention claimed is:

1. A textile article comprising:
   a pattern including a composition of graphene,
   said pattern defining a surface comprising empty portions on which said composition comprising graphene is not present, and full portions on which said composition comprising graphene is present, said pattern also comprising lines intersecting in a plurality of points and forming a network structure;
   said full portions occupying from 10% to 70% of said surface and said empty portions occupying from 90% to 30% of said surface;
   said graphene of said composition of graphene comprising graphene nanoplatelets with at least 90% of said graphene nanoplatelets having a lateral size from 50 nm to 50000 nm and a thickness from 0.34 nm to 50 nm; and
   said graphene nanoplatelets having a carbon to oxygen (C/O) ratio greater than or equal to 100:1;
   wherein said textile article comprises an amount of graphene distributed along said pattern of from 0.2 to 5 g/m2 of textile article.

2. The textile article of claim 1, wherein said network pattern further comprises a thermal circuit has an electrical conductivity, expressed as surface resistivity, from $10^4$ Ω/□ to $10^8$ Ω/□, measured according to the standard JIS K 7194.

3. The textile article of claim 2, wherein said thermal circuit has an electrical conductivity, expressed as surface resistivity, from $10^5$ Ω/□ to $10^7$ Ω/□, measured according to the standard JIS K 7194.

4. The textile article of claim 1, wherein said full portions occupy from 13% to 60% of said surface and said empty portions occupy from 87% to 40% of said surface.

5. The textile article of claim 1, wherein said composition further comprises a polymeric binder.

6. The textile article of claim 1, wherein at least 90% of said graphene nanoplatelets have a lateral size from 100 nm to 10,000 nm and a thickness from 0.34 nm to 10 nm.

7. The textile article of claim 1, wherein said graphene is distributed along said pattern in an amount from 0.4 g/m$^2$ to 4 g/m$^2$.

8. The textile article of claim 1, wherein the textile article comprises clothing.

9. The textile article of claim 8, wherein the clothing comprises one or more of shirts, T-shirts, jackets, sweatshirts, sweaters, trousers, shorts, hats, bonnets, socks, shoes, shoe linings, gloves, and glove linings.

10. A method for preparing a textile article comprising the steps of:
    (A) applying a composition comprising:
        from 10 to 40% by weight of a polymeric binder,
        from 1 to 15% by weight of a compatibilizing solvent for said polymeric binder,
        from 1% to 8% by weight of a thickener,
        from 1% to 20% by weight of graphene comprising graphene nanoplatelets, in which at least 90% of said graphene nanoplatelets have a lateral size from 50 nm to 50,000 nm and a thickness from 0.34 nm to 50 nm, and a carbon to oxygen C/O ratio of said graphene nanoplatelets is greater than or equal to 100:1,
        from 17% to 87% by weight of water, and
        a viscosity in the range of 4,000 cPs to 30,000 cPs,
        to a textile article according to pattern defining a surface comprising empty portions on which said composition comprising graphene is not applied, and full portions on which said composition comprising graphene is applied, wherein said full portions occupy from 10% to 70% of said surface and said empty portions occupy from 90% to 30% of said surface;
    (B) applying said composition so that graphene is deposited in said pattern in an amount from 0.2 to 5 g/m$^2$ of textile article; and
    (C) heating said surface at an increasing temperature of between 120° C. and 180° C. for a time of between 1 and 10 minutes.

11. The method of fabricating the textile article according to claim 10, wherein said full portions occupy from 13% to 60% of said surface and said empty portions occupy from 87% to 45% of said surface.

12. The method of fabricating the textile article according to claim 11, wherein said pattern further comprises lines that intersect in a plurality of points and form a network structure.

13. The method of fabricating the textile article according to claim 12, wherein said thermal circuit has an electrical conductivity, expressed as surface resistivity, measuring from $10^4$ Ω/Y to $10^8$ Ω/Y, in conformance with the JIS K 7194 standard.

14. The method of fabricating the textile article according to claim 12, wherein said thermal circuit has an electrical conductivity, expressed as surface resistivity, measuring from $10^5$ Ω/Y to $10^7$ Ω/Y, in conformance with the JIS K 7194 standard.

15. The method of fabricating the textile article according to claim 10, wherein step A) further comprises applying said composition so graphene is deposited in said pattern in an amount of from 0.4 g/m$^2$ to 4 g/m$^2$.

16. The method of fabricating the textile article according to claim 10, wherein step A) further comprises applying said composition by screen printing.

17. The method of fabricating the textile article according to claim 10 wherein the textile article comprises clothing.

* * * * *